US012722554B2

(12) United States Patent
Habegger

(10) Patent No.: US 12,722,554 B2
(45) Date of Patent: Sep. 1, 2026

(54) HINGE STRUCTURE FOR A VEHICLE

(71) Applicant: Honda Motor Co., Ltd., Tokyo (JP)

(72) Inventor: Clayton R Habegger, Mansfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 423 days.

(21) Appl. No.: 18/499,053

(22) Filed: Oct. 31, 2023

(65) Prior Publication Data

US 2025/0135981 A1 May 1, 2025

(51) Int. Cl.
*B60P 1/28* (2006.01)

(52) U.S. Cl.
CPC .................................... *B60P 1/283* (2013.01)

(58) Field of Classification Search
CPC .... B60P 1/28; B60P 1/283; B60P 1/00; B60P 1/26; B60P 1/16; E05D 5/06; E05D 5/10; E05D 5/14; E05D 7/10; B60D 1/00; A01D 1/00; B62D 49/00; E01C 1/00
USPC ............................................................ 296/17
See application file for complete search history.

(56) References Cited

U.S. PATENT DOCUMENTS

| | | | |
|---|---|---|---|
| 4,874,284 A | 10/1989 | New, Jr. | |
| 7,455,489 B1 | 11/2008 | Klev et al. | |
| 9,481,402 B1 | 11/2016 | Muto et al. | |
| 10,189,428 B1 | 1/2019 | Sellars et al. | |
| 10,793,192 B2 | 10/2020 | Sellars et al. | |
| 11,577,797 B2 | 2/2023 | Yamamoto et al. | |
| 11,624,215 B2 | 4/2023 | Martin et al. | |
| 2013/0025954 A1* | 1/2013 | Miller | B62D 25/10 180/69.21 |
| 2024/0123889 A1* | 4/2024 | Lemaire | B60P 1/283 |

FOREIGN PATENT DOCUMENTS

| | | |
|---|---|---|
| CN | 102001304 B | 5/2012 |
| CN | 209534872 U | 10/2019 |
| CN | 217435939 U | 9/2022 |
| CN | 217435942 U | 9/2022 |
| CN | 217515298 U | 9/2022 |

* cited by examiner

*Primary Examiner* — Amy R Weisberg
*Assistant Examiner* — Daniel R Digiovannantonio
(74) *Attorney, Agent, or Firm* — Joshua Freier; American Honda Motor Co., Ltd.

(57) ABSTRACT

A hinge structure is configured to pivotably couple a utility bed to a vehicular frame, and includes a frame portion adapted to be removably coupled to the vehicular frame. The frame portion includes a base adapted to contact the vehicular frame and defining a hole to receive a fastener to enable the removably coupling of the frame portion with the vehicular frame. The hinge structure further includes a barrel portion supported on the frame portion and adapted to pivotally engage with the utility bed.

9 Claims, 6 Drawing Sheets

HINGE STRUCTURE FOR A VEHICLE

BACKGROUND

The disclosed subject matter relates generally to a vehicle having a bed adapted to pivot between a hauling position and a dumping position. More particularly, the disclosed subject matter relates to a hinge structure that pivotally couples the bed to a frame of the vehicle.

Certain conventional vehicles include a utility bed which is movable between a hauling position and a dumping position. Such a utility bed is often referred to as a "dump bed" and is suitable to facilitate transportation of cargo.

SUMMARY

In accordance with one embodiment of the present disclosure, a hinge structure for a vehicle is disclosed. The vehicle includes a vehicular frame and a utility bed. The hinge structure is configured to pivotably couple the utility bed to the vehicular frame, and includes a frame portion adapted to be removably coupled to the vehicular frame. The frame portion includes a base adapted to contact the vehicular frame and defining a hole to receive a fastener to enable the removably coupling of the frame portion with the vehicular frame. The hinge structure further includes a barrel portion supported on the frame portion and adapted to pivotally engage with the utility bed.

In accordance with another embodiment of the present disclosure, a vehicle is provided. The vehicle includes a vehicular frame defining an opening and a utility bed pivotally coupled to the vehicular frame and pivotable between a hauling position and a dumping position. The vehicle also includes a hinge structure pivotally coupling the utility bed to the vehicular frame. The hinge structure includes a frame portion removably coupled to the vehicular frame and including a base arranged contacting the vehicular frame. The base defines a hole arranged aligned with the opening. The hinge structure further includes a barrel portion supported on the frame portion and pivotally coupled with the utility bed. The utility bed pivots about a central axis of the barrel portion. Moreover, the vehicle includes a fastener extending through the aligned hole and the opening and removably coupling the hinge structure to the vehicular frame.

In accordance with yet a further embodiment of the present disclosure a vehicle is disclosed. The vehicle includes a vehicular frame defining an opening, and a utility bed pivotally coupled to the vehicular frame and pivotable between a hauling position and a dumping position. The vehicle further includes a hinge structure pivotally coupling the utility bed to the vehicular frame. The hinge structure includes a frame portion removably coupled to the vehicular frame and includes a base arranged contacting the vehicular frame and defining a hole arranged aligned with the opening. The hinge structure also includes a barrel portion supported on the frame portion and integrally attached to the frame portion. The utility bed is pivotally coupled to the barrel portion and pivots about a central axis of the barrel portion. Moreover, the hinge structure includes a stopper structure integrally attached to the frame portion and configured to abut the utility bed in the dumping position. Furthermore, the vehicle includes a fastener extending through the aligned hole and the opening and removably coupling the hinge structure to the vehicular frame.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-6, wherein like numbers indicate the same or corresponding elements throughout the views.

Figure 1:
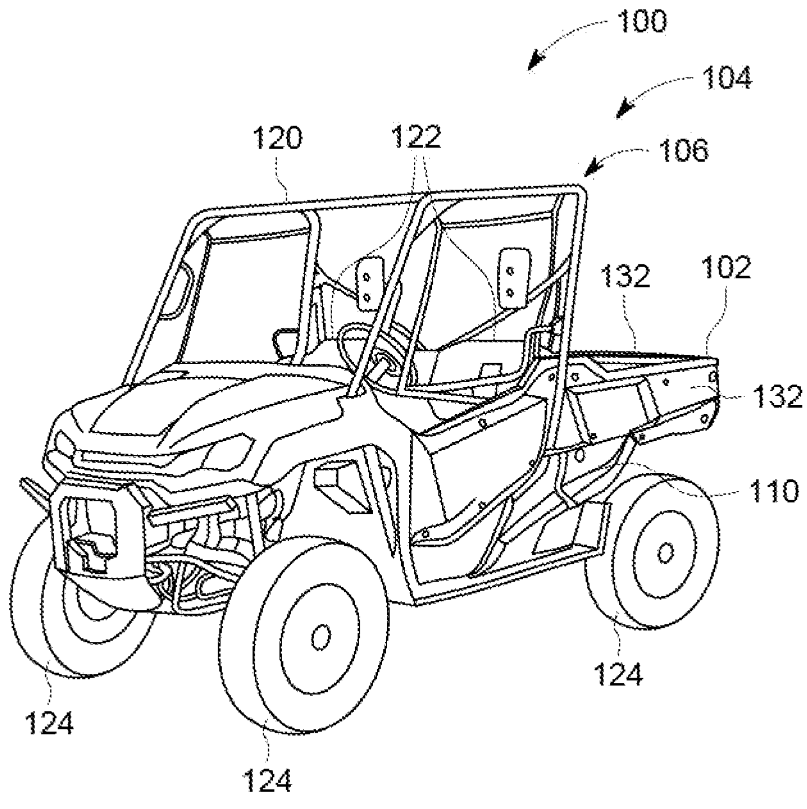
FIG. 1 is a perspective view of a vehicle, in accordance with one embodiment of the present disclosure.

Referring to FIG. 1, a vehicle 100 including a utility bed 102 which can be used to facilitate hauling of cargo by the vehicle 100 is shown. In one embodiment, the vehicle 100 is a dump-type vehicle 104 having the utility bed 102 that facilitates selective dumping of the cargo from the utility bed. A dump-type vehicle 104 can comprise a light utility vehicle, such as the utility vehicle 106 shown in FIG. 1. In other embodiments, a dump-type vehicle 104 can comprise any of a variety of other types of vehicles having a utility bed that is capable of dumping (e.g., a dump bed) such as, for example, a pickup truck, a dump truck, an all terrain vehicle ("ATV"), and a golf cart, for example. In another embodiment, the vehicle can include a trailer.

Figure 2:
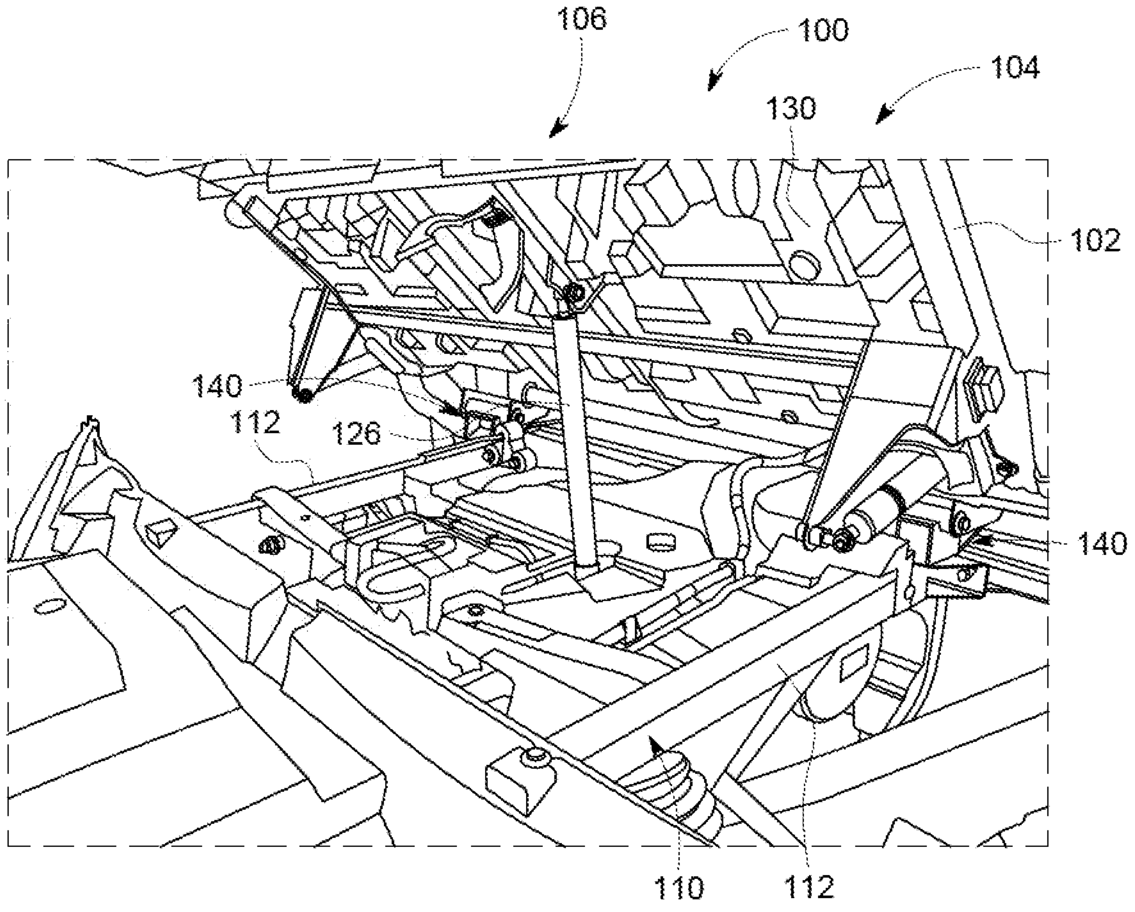
FIG. 2 is a perspective view of a portion of the vehicle depicting a vehicular frame and a utility bed pivoted to a dumping position, in accordance with one embodiment of the present disclosure.
Figure 3:
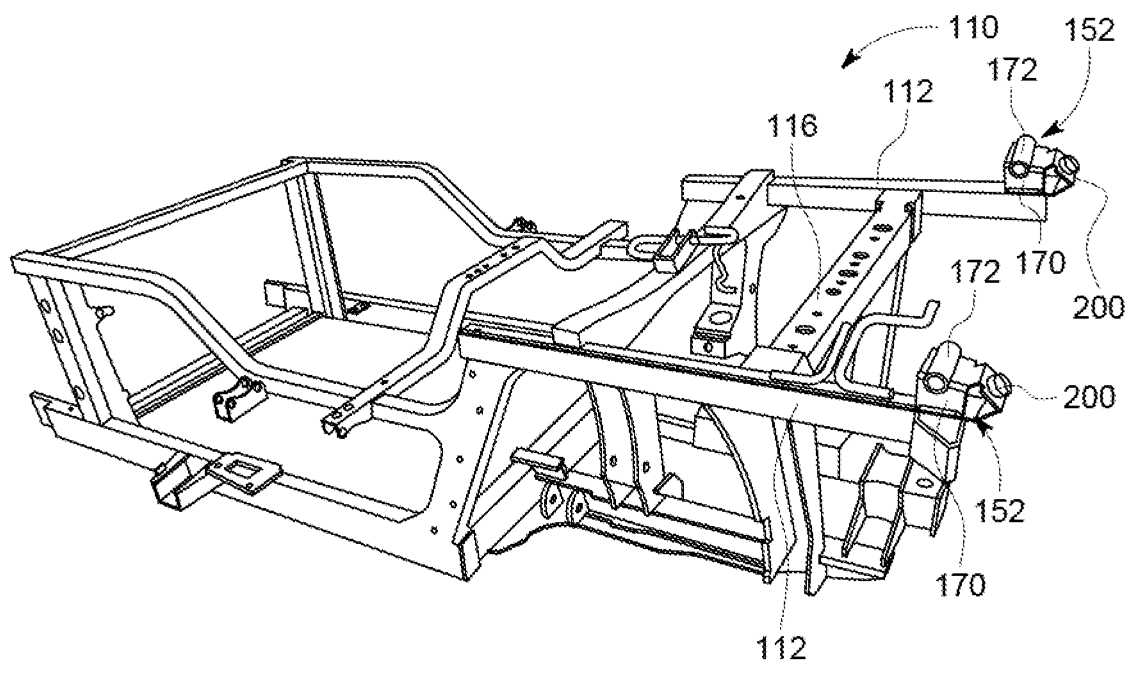
FIG. 3 is a perspective view of the vehicular frame with two hinge structures attached to the frame, in accordance with one embodiment of the present disclosure.

Referring to FIGS. 1 to 3, the vehicle 100 includes a vehicular frame 110 having variety of structural and/or decorative rails, panels, and/or other components which are typically, although not necessarily, formed from metal (e.g., steel and/or aluminum). For example, as best shown in FIG. 3, the frame 110 includes a pair of rails 112 extending in a longitudinal direction and a plurality of cross-members 116 extending in the lateral direction and connected to the pair of rails 112. The rails 112 and the cross-members 116 together support various components of the vehicle 100, for example, a passenger cabin 120, seats 122, traction members 124, etc.

Further, the utility bed 102 is pivotally coupled to the frame 110 and is adapted to pivot between a hauling position (shown in FIG. 1) and a dumping position (shown in FIG. 2) relative to the frame 110. To move the utility bed 102 between the hauling position and the dumping position, the vehicle 100 includes an actuator 126 (shown in FIG. 2) coupled with the frame 110 and the utility bed 102. In one embodiment, the actuator 126 may include an electric linear actuator, as illustrated in FIG. 2. It will be appreciated that any of a variety of known conventional mechanisms or methods (none shown) can be provided to facilitate manual or powered movement of the utility bed 102 between the hauling and dumping positions under control of an operator of the vehicle 100.

The utility bed 102 includes a bed floor 130 and a plurality of walls 132 extending substantially perpendicularly to the bed floor 130. The bed floor 130 and the walls 132 cooperate to retain the cargo inside the bed 102. Moreover, in some embodiments, one of walls, for example, a rear wall, also referred to as a tailgate, is adapted to move between an open position and a close position. The rear wall is moved to the open position to allow a removal of the cargo from the bed 102, when the bed 102 is moved from the hauling position to the dumping position.

Figure 4:
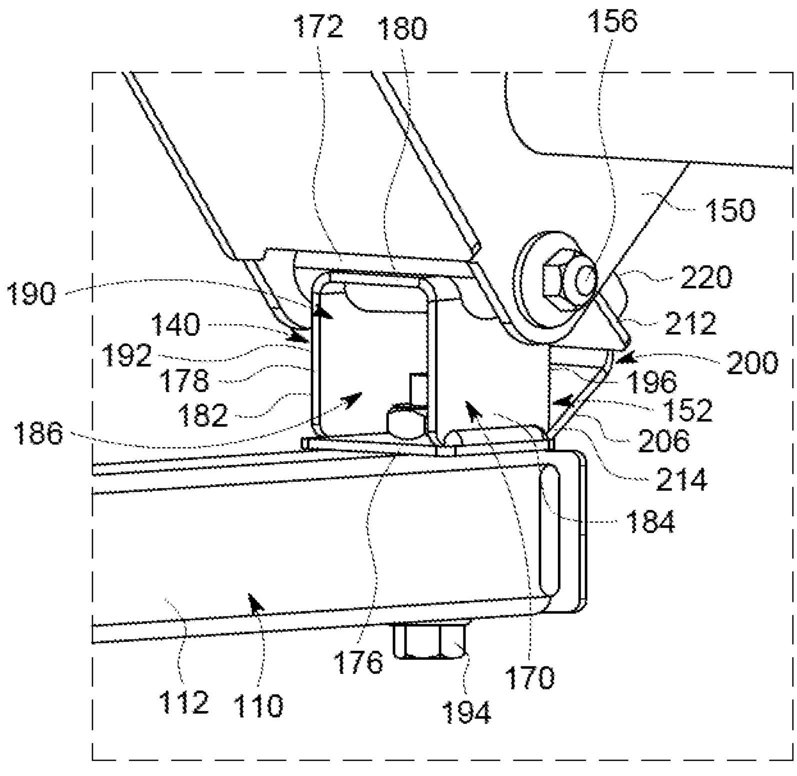
FIG. 4 depicts an enlarged perspective view of a portion of the vehicle depicting a hinge structure pivotally coupled with the utility bed, in accordance with one embodiment of the present disclosure.
Figure 5:
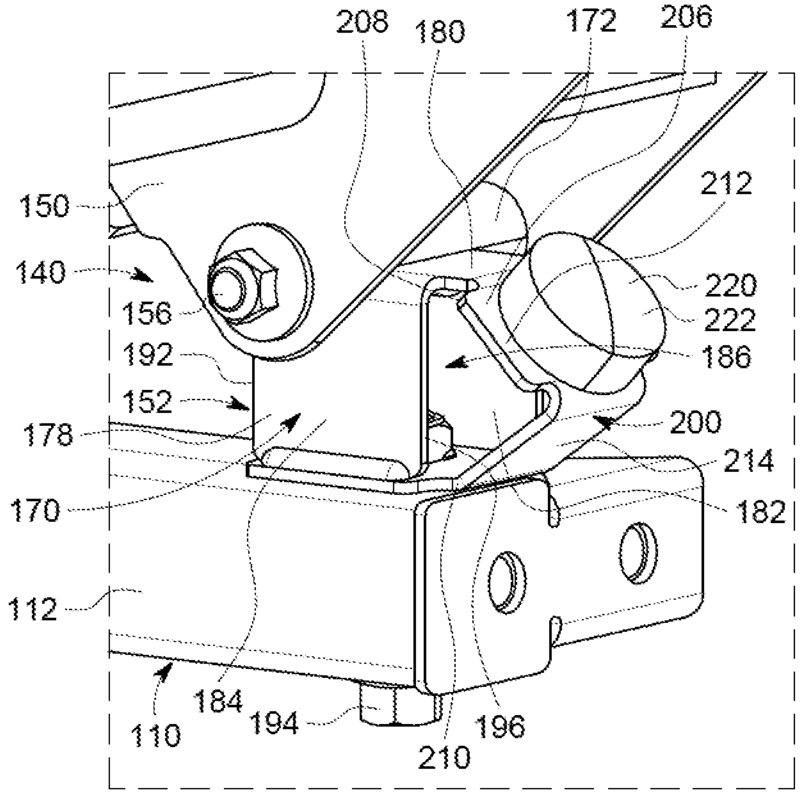
FIG. 5 depicts an enlarged perspective view of a portion of the vehicle depicting a hinge structure pivotally coupled with the utility bed, in accordance with one embodiment of the present disclosure.

To facilitate the pivotal coupling of the utility bed 102 with the frame 110, the vehicle 100 includes a pair of hinge assemblies 140, shown in FIG. 2. Referring to FIGS. 4 and 5, the hinge assembly 140 includes a fork structure 150 coupled/attached to the utility bed 102, for example, the bed floor 130 of the bed 102, and a hinge structure 152 removably coupled to the rail 112 of the frame 110 and is pivotally coupled to the fork structure 150 via a pin 156. The utility bed 102 is arranged to pivot about a central axis 160 of the pin 156.

Figure 6:
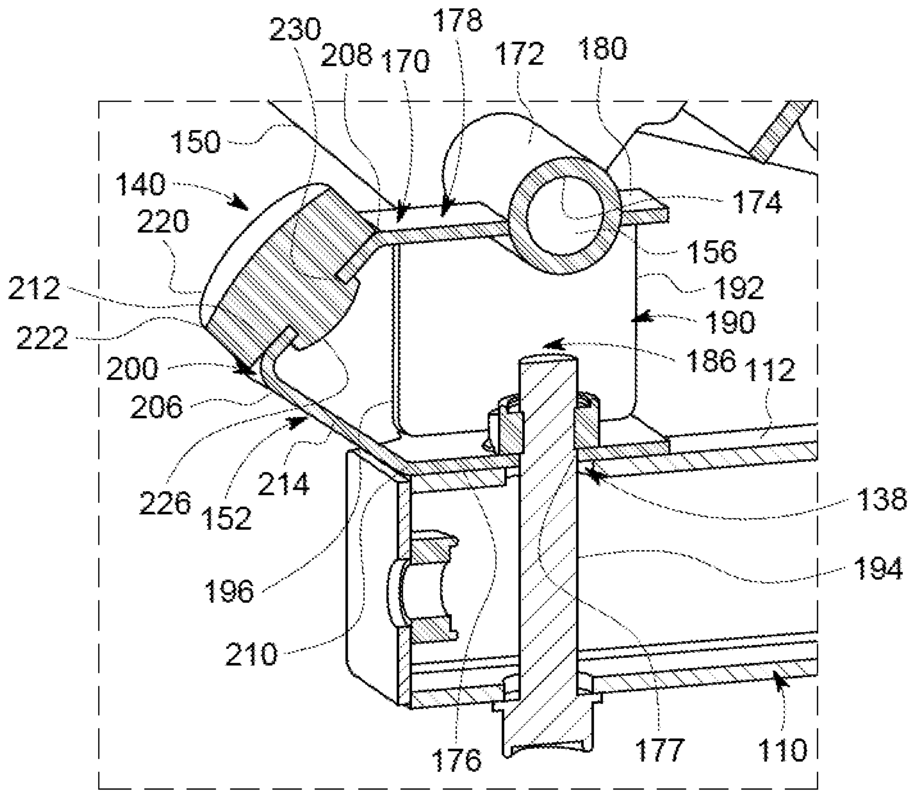
FIG. 6 depicts a sectional view of the portion of the vehicle shown in FIG. 5, in accordance with one embodiment of the present disclosure.

Referring to FIGS. 4 to 6, the hinge structure 152 is removably coupled to the rail 112 and includes a frame portion 170 and a barrel portion 172 attached to the frame portion 170 and engaged with the fork structure 150 of the utility bed 102 via the pin 156. As shown, the barrel portion 172 defines an elongated channel 174 (shown in FIG. 6) through which the pin 156 extends in an assembly of the hinge structure 152 with the fork structure 150. In an embodiment, the barrel portion 172 is fixedly attached to the frame portion 170, and extends in the lateral direction of the vehicle 100. For example, the barrel portion 172 is welded to the frame portion 170 of the hinge structure 152.

As shown, the frame portion 170 includes a base 176 defining a hole 177 (shown in FIG. 6) that aligns with an opening 138 (shown in FIG. 6) of the rail 112 to facilitate an assembly of the hinge structure 152 with the rail 112. In some embodiments, the rails 112 may be hollow tubes having substantially square cross-sections. In such a case, one or more reinforcement plates (not shown) may be arranged inside the rails 112 at a location proximate to the hole 177 to prevent a collapsing of the rails 112 when the hinge structures 152 are coupled to the rails 112. In some embodiments, the rails 112 may be solid shafts.

As shown, the base 176 is arranged abutting the rail 112 and removably coupled to the rail 112. The hinge structure 152 also includes an inverted U-shaped bracket 178 extending vertically from the base 176. As shown, bracket 178 includes a roof plate 180 and a pair of sidewalls 182, 184 extending downwardly from the roof plate 180 to the base 176 and engaged with the base 176. The roof plate 180 is arranged opposite and facing the base 176 defining a gap 186 therebetween. In an embodiment, the bracket 178 is fixedly attached to the base 176. For example, the sidewalls 182, 184 are welded to the base 176. Alternatively, the bracket 178 and the base 176 are integrally formed with each other. Moreover, as shown, the barrel portion 172 is attached to and supported on the roof plate 180 and is arranged outwardly such that a portion of the barrel portion 172 extends vertically upwardly of the bracket 178.

Further, the sidewalls 182, 184 of the bracket 178 are disposed spaced apart and substantially parallel to each other, and extend in the longitudinal direction of the vehicle 100. Accordingly, a first end opening 190 (shown in FIG. 4) of the frame portion 170 is defined between the roof plate 180, the base 176, and the pair of sidewalls 182, 184 and is disposed at a front end 192 of the frame portion 176. The first end opening 190 facilitates the attachment and removal of the frame portion 170 (i.e., hinge structure 152) with the rail 112 via a fastener 194 by allowing an insertion of a fastening tool inside the gap 186 to hold a nut, while tightening a bolt 194 (i.e., fastener 194) that extends through the aligned hole 177 and the opening 138.

Moreover, the hinge structure 152 includes a stopper structure 200 arranged at a rear end 196 of the frame portion 170, opposite to and facing the first end opening 190. The stopper structure 200 is arranged to abut the utility bed 102 in the dumping position of the utility bed 102, and restricts/prevents the tilting of the bed 102 beyond a predefined angle. As shown, the stopper structure 200 is coupled to the bracket 178 and includes a wall 206 having a first end 208 (i.e., top end 208) attached to the roof plate 18. The wall 206 extends in the vertically downward direction from the roof plate 180 and includes a second end 210 attached to the base 176. As shown, the wall 206 includes a first wall portion 212 extending from the first end 208 towards the second end 210 of the wall 206 and a second wall portion 214 extending from the first wall portion 212 to the second end 210. In an embodiment, the wall 206 is fixedly attached to the bracket 178 and the base 176. For example, the first end 208 and the second end 210 of the wall 206 are welded to the roof plate 180 and the base 176, respectively. Alternatively, the wall 206 may be integrally formed with the bracket 178 or attached with the bracket 178.

As shown, the first wall portion 212 and the second wall portion 214 together define a horizontally oriented V shaped wall with the first wall portion 212 extending obliquely and outwardly from the roof plate 180 to the second wall portion 214 and the second wall portion 214 extending obliquely inwardly from the first wall portion 212 to the second end 210 (i.e., the base 176). Accordingly, an angle defined between the roof plate 180 and the first wall portion 212 defines the predefined angle of the tilting of the utility bed 102 relative to the frame 110 in the dumping position.

Moreover, referring to FIGS. 5 and 6, the stopper structure 200 includes a stopper 220 configured to abut the utility bed 102 and coupled to the first wall portion 212. In an embodiment, the stopper 220 includes a disc shaped structure 222 having a central axis extending substantially perpendicular to an outer surface of the first wall portion 212. In an embodiment, the stopper 220 may be removably attached to the first wall portion 212. To enable such an engagement, the stopper 220 may include a protrusion 226 (shown in FIG. 6) that extends inside a cavity 230 (shown in FIG. 6) of the wall 206 i.e., the first wall portion 212. Alternatively, the stopper 220 may be fixedly attached or integrally formed with the first wall portion 212. In some embodiments, the stopper 220 may provide a cushioning effect and may be made of material having damping properties. For example, the stopper 220 may be made of nylon, cast iron, or any other similar material known in the art.

A method for assembling the utility bed 102 to the frame 110 is now described. The method includes assembling or attaching two hinge structures 152 with the fork structures 150 attached to the bed 102 via the pins 156. Thereafter, the two hinge structures 152 are coupled with the rails 112 via two fasteners 194. For assembling the hinge structures with the rails 112, a technician may first couple one of the hinge structures 152 (i.e., the first hinge structure 152) with one or the rails 112 (i.e., first rail 112). For so doing, the technician positions the base 176 of the first hinge structure 152 on the first rail 112 such that the hole 177 of the base 176 is aligned with the opening 138 of the first rail 112. Also, first hinge structure 152 is arranged on the first rail 112 such that the stopper structure 200 extends rearwardly of the bracket 178 in the longitudinal direction. Upon aligning the hole 177 with the opening 138, the first hinge structure 152 is engaged with the first rail 112 by extending the fastener 194 through the aligned hole 177 and the opening 138 and loosely tightens the fastener 194, allowing a small movement of the first hinge structure 152 relative to the first rail 112. Thereafter, another hinge structure 152 (i.e., second hinge structure 152) is attached to the other rail 112 (i.e., second rail 112) by aligning the hole 177 of the base 176 of second hinge structure 152 with the opening 138 of second rail 112 and then inserting a fastener through the opening 138 and the hole 177. As the first hinge structure 152 is loosely coupled with the first rail 112, the alignment of the hole 177 of the second hinge structure 152 with the opening 138 of the second rail 112 is performed easily. Upon loosely coupling both the hinge structures 152 to the rails 112, the fasteners 194 are tightened with required torque to prevent any relative movement between the rails 112 and the hinge structures 152.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A hinge structure for a vehicle having a vehicular frame and a utility bed, the hinge structure being configured to pivotably couple the utility bed to the vehicular frame, the hinge structure comprising:

a frame portion adapted to be removably coupled to the vehicular frame and including a base adapted to contact the vehicular frame and defining a hole to receive a fastener to enable the removable coupling of the frame portion with the vehicular frame, wherein the frame portion includes an inverted U-shaped structure extending vertically from the base and defining a first end opening to provide access to an inside of the frame portion to facilitate coupling and decoupling of the frame portion with the vehicular frame via the fastener, wherein the inverted U-shaped structure includes a pair of sidewalls arranged spaced apart and parallel to each other, the pair of sidewalls extending perpendicularly to the base, and a roof plate arranged opposite to and facing the base and supported on the pair of sidewalls;

a barrel portion supported on the frame portion and adapted to pivotally engage with the utility bed, wherein the barrel portion is fixedly attached to and supported on the roof plate; and a stopper structure coupled to the frame portion and disposed opposite to and facing the first end opening, wherein the stopper structure is configured to abut the utility bed to prevent tilting of the utility bed beyond a predefined angle, wherein the stopper structure includes a wall extending obliquely and outwardly from the roof plate in a vertically downward direction, and a stopper attached to the wall and extending substantially perpendicularly to the wall, wherein the stopper is configured to abut the utility bed.

2. The hinge structure of claim 1, wherein the wall is integrally attached to the frame portion.

3. The hinge structure of claim 1, wherein the stopper is removably engaged with the wall.

4. The hinge structure of claim 3, wherein the wall defines a cavity and the stopper includes a protrusion extending through the cavity to enable the removable engagement of the stopper to the wall.

5. A vehicle, comprising:

a vehicular frame defining an opening;

a utility bed pivotally coupled to the vehicular frame and pivotable between a hauling position and a dumping position;

a hinge structure pivotally coupling the utility bed to the vehicular frame, the hinge structure including:

a frame portion removably coupled to the vehicular frame and including a base arranged contacting the vehicular frame and defining a hole arranged aligned with the opening, wherein the frame portion includes an inverted U-shaped structure extending vertically from the base and defining a first end opening to provide access to an inside of the frame portion to facilitate coupling and decoupling of the frame portion with the vehicular frame via the fastener, wherein the inverted U-shaped structure includes a pair of sidewalls arranged spaced apart and parallel to each other, the pair of sidewalls extending perpendicularly to the base, and a roof plate arranged opposite to and facing the base and supported on the pair of sidewalls;

a barrel portion supported on the frame portion and pivotally coupled with the utility bed, wherein the utility bed pivots about a central axis of the barrel portion, wherein the barrel portion is fixedly attached to and supported on the roof plate; and a stopper structure coupled to the frame portion and disposed opposite to and facing the first end opening, wherein the stopper structure is configured to abut the utility bed in the dumping position, wherein the stopper structure includes a wall extending obliquely and outwardly from the roof plate in a vertically downward direction, and a stopper attached to the wall and extending substantially perpendicularly to the wall, wherein the stopper abuts the utility bed in the dumping position; and a fastener extending through the aligned hole and the opening and removably coupling the hinge structure to the vehicular frame.

6. The vehicle of claim 5, wherein the wall is integrally attached to the frame portion.

7. The vehicle of claim 5, wherein the stopper is removably engaged with the wall.

8. The vehicle of claim 7, wherein the wall defines a cavity and the stopper includes a protrusion extending through the cavity to enable the removable engagement of the stopper to the wall.

9. A vehicle, comprising:

a vehicular frame defining an opening;

a utility bed pivotally coupled to the vehicular frame and pivotable between a hauling position and a dumping position;

a hinge structure pivotally coupling the utility bed to the vehicular frame, the hinge structure including:

a frame portion removably coupled to the vehicular frame and including a base arranged contacting the vehicular frame and defining a hole arranged aligned with the opening, wherein the frame portion includes an inverted U-shaped structure extending vertically from the base and defining a first end opening to provide access to an inside of the frame portion to facilitate coupling and decoupling of the fastener to the frame portion and the vehicular frame, wherein the inverted U-shaped structure includes a pair of sidewalls arranged spaced apart and parallel to each other, the pair of sidewalls extending perpendicularly to the base, and a roof plate arranged opposite to and facing the base and supported on the pair of sidewalls;

a barrel portion supported on the frame portion and integrally attached to the frame portion, wherein the utility bed is pivotally coupled to the barrel portion and pivots about a central axis of the barrel portion, wherein the barrel portion is fixedly attached to and supported on the roof plate; and a stopper structure integrally attached to the frame portion and configured to abut the utility bed in the dumping position, wherein the stopper structure includes a wall extending obliquely and outwardly from the roof plate in a vertically downward direction, and a stopper attached to the wall and extending substantially perpendicularly to the wall, wherein the stopper abuts the utility bed in the dumping position; and a fastener extending through the aligned hole and the opening and removably coupling the hinge structure to the vehicular frame.

* * * * *